H. TSCHERNING.
MOLDING MACHINE.
APPLICATION FILED FEB. 7, 1921.
1,427,339.
Patented Aug. 29, 1922.
4 SHEETS—SHEET 3.
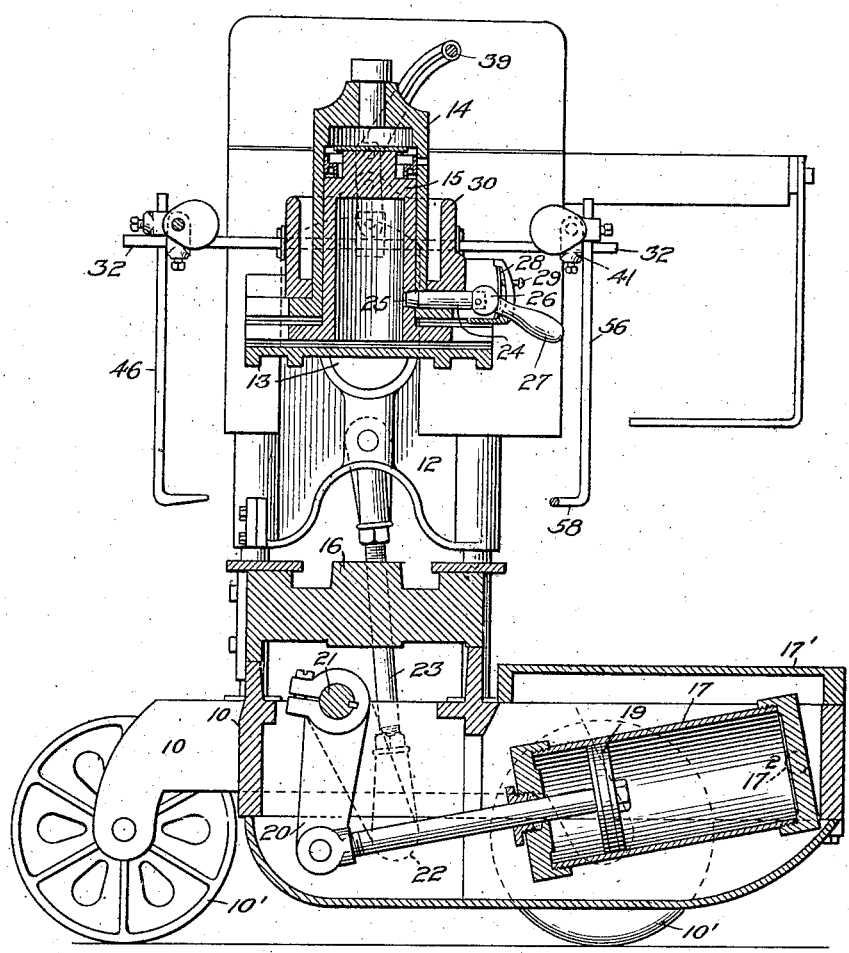
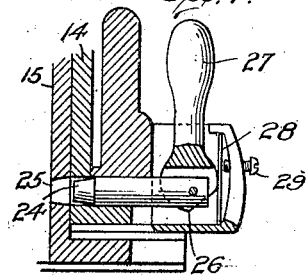
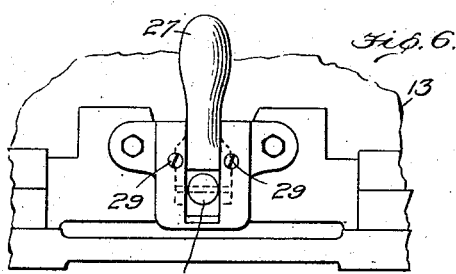
Inventor
Henry Tscherning
By Greene & Greene
Attorneys

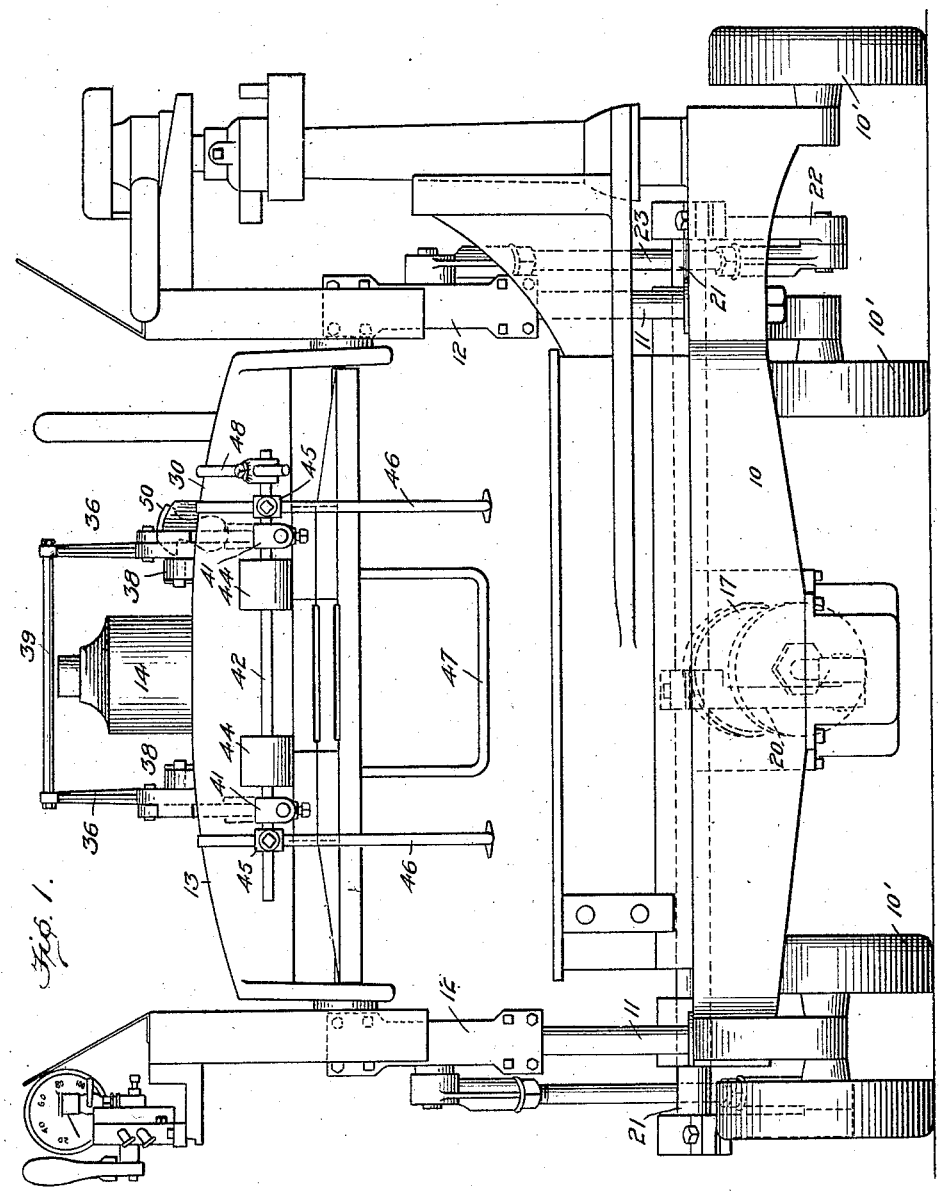

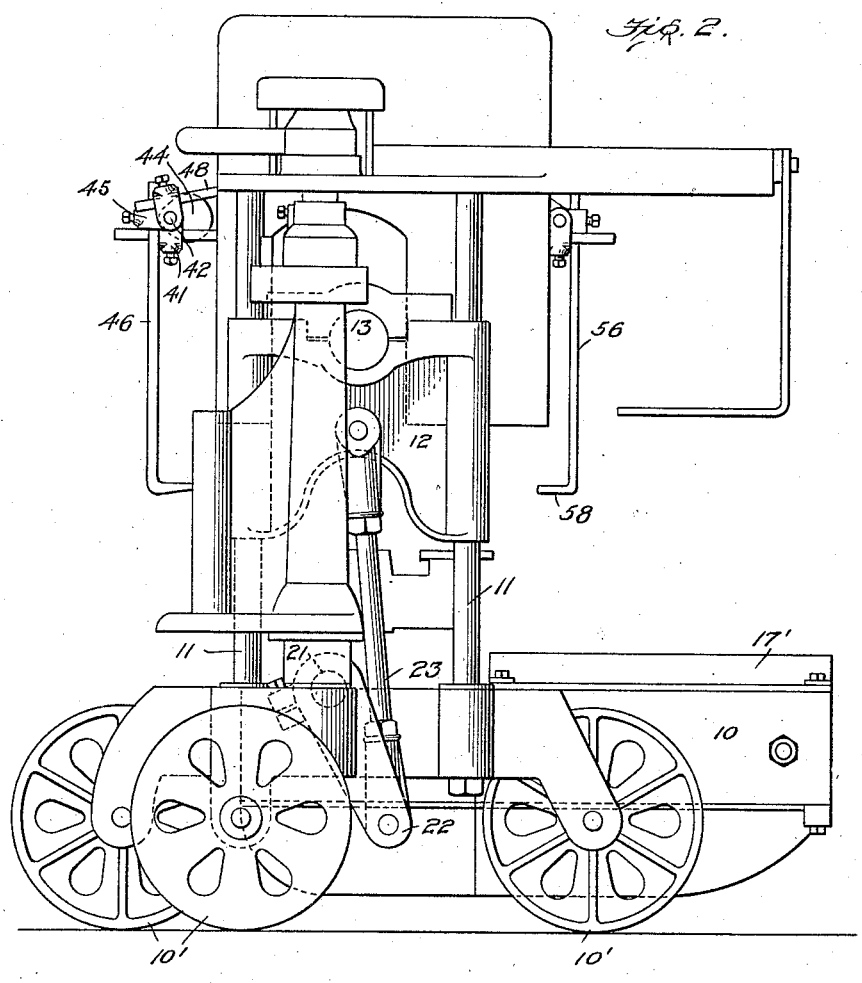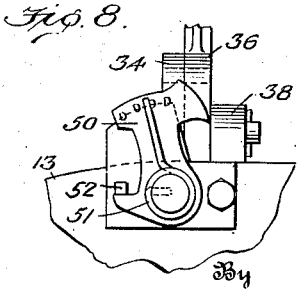

H. TSCHERNING.
MOLDING MACHINE.
APPLICATION FILED FEB. 7, 1921.

1,427,339.

Patented Aug. 29, 1922.
4 SHEETS—SHEET 4.

Inventor
Henry Tscherning
By Greene & Greene,
Attorneys

UNITED STATES PATENT OFFICE.

HENRY TSCHERNING, OF FREEPORT, ILLINOIS, ASSIGNOR TO ARCADE MANUFACTURING COMPANY, OF FREEPORT, ILLINOIS, A CORPORATOIN OF ILLINOIS.

MOLDING MACHINE.

1,427,339.          Specification of Letters Patent.     Patented Aug. 29, 1922.

Application filed February 7, 1921. Serial No. 443,057.

*To whom it may concern:*

Be it known that I, HENRY TSCHERNING, a citizen of the United States, and resident of Freeport, in the county of Stephenson and State of Illinois, have invented certain new and useful Improvements in Molding Machines, of which the following is a specification, reference being had therein to the accompanying drawing.

This invention relates to improvements in sand jarring and flask inverting molding machines of the type shown in my Patent No. 1,304,922, and among its objects are to provide a machine which is mounted on wheels, which permits raising the pattern to any desirable height in withdrawing and yet is always at a convenient height; to provide a machine having a single operating pneumatic cylinder which always raises the opposite sides or ends of the flask to precisely the same extent; to lock the sand jarring piston rigidly when it is out of use; and to provide for conveniently adjusting certain flask clamps, drawing them against the flask, and locking them against accidental release.

In the accompanying drawings,

Fig. 1 is a side elevation of the machine.

Fig. 2 is an end elevation of the same.

Fig. 3 is a vertical section through a jarring cylinder and a power cylinder, the section being axial in each case.

Figs. 6 and 7 are enlarged detail views of devices for locking a jarring piston.

Fig. 8 is a detail view of a catch device shown also in Fig. 4.

Figure 4:
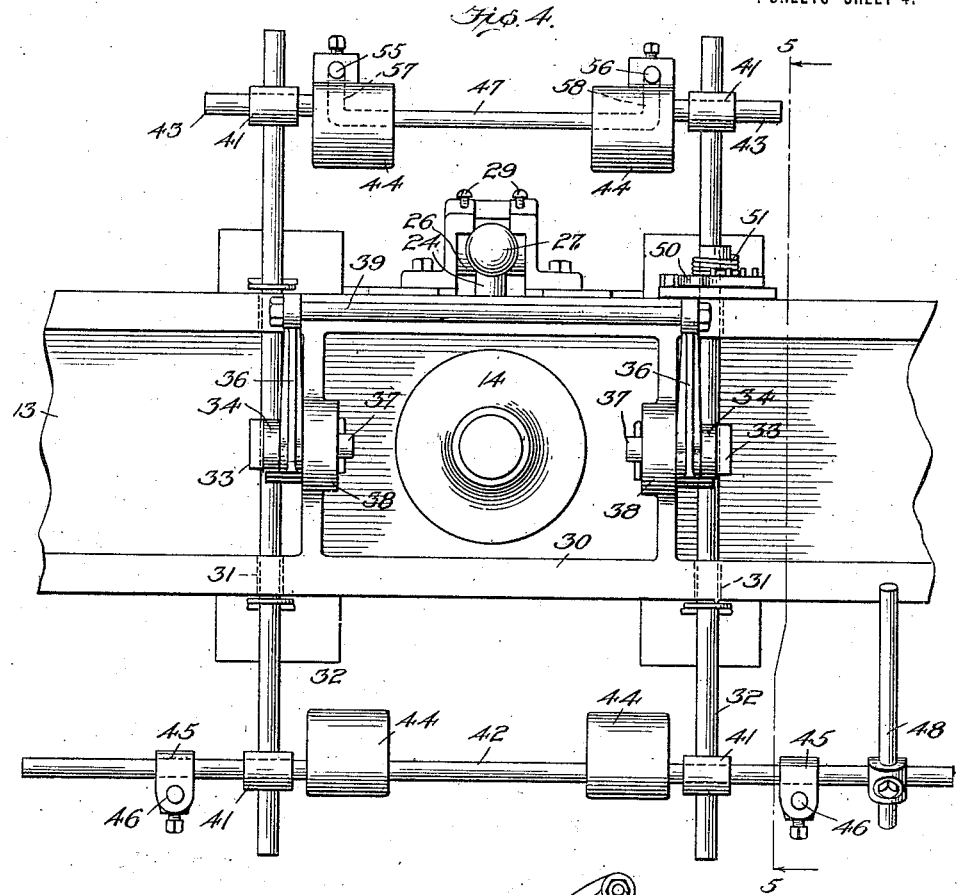
Fig. 4 is a bottom plan view of an inverting flask table.
Figure 5:
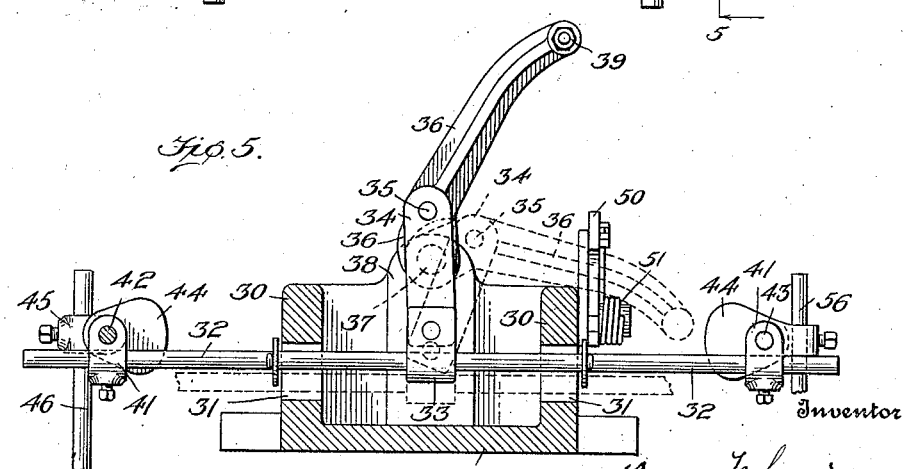
Fig. 5 is a section on the line 5—5, Fig. 4.

As above suggested, it is often desirable to raise the pattern to such an extent that when the lifting is by vertical cylinders, the latter must be inconveniently long and much of the apparatus is permanently at an inconvenient height, and commonly the cylinders extend below the molding floor, which in itself is undesirable and which prevents the use of a portable wheeled machine that may be pushed about on the molding floor at will. This difficulty is here fully eliminated, and at the same time the lifting devices are materially simplified, with gain in construction and upkeep cost.

Many other advantages will appear from the description of the construction and operation.

The machine has a heavy base 10 supported on small wheels $10^1$ and provided with upright guide rods 11 at each end, with slides 12 moving on each end pair of rods, respectively. A pattern table 13 is mounted in said slides to rotate about its longitudinal axis for inverting the table and a flask thereon and near its middle is located a jarring cylinder 14 containing a piston 15 arranged to strike the cylinder, in abruptly falling, which at this time rests upon an anvil 16 supported by the base.

The piston is reciprocated by common devices and except the wheels which are not found in my said prior patent, all these parts are not widely different from the corresponding devices there disclosed.

The base has near its middle and above the floor line a laterally extending approximately horizontal pneumatic cylinder 17 covered by a casing $17^1$ pivoted to rock on a horizontal axis $17^2$ and having its piston 19 connected to a crank arm 20 at the middle of a heavy rock shaft 21 mounted in suitable bearings and carrying at each end a crank arm 22, below the corresponding slide 12, and connected thereto by a common pitman 23 of adjustable length.

For locking the jarring piston 15 when it is not in operation, I provide a taper-pointed pin 24 sliding in a way in the table, passing through the wall of the cylinder 14 and fitting in a like tapered aperture 25 in the piston. This pin is moved into and out of said aperture at will by means of an eccentric 26 actuated by a hand lever 27 and locked at either limit of its path by a spring 28 adjusted in position by a screw 29.

The pattern table has normally depending longitudinal webs 30 and through these pass, in slots 31, two parallel transverse rods 32. Centrally upon these rods, respectively, are fixed spaced blocks 33, pivotally connected by links 34 to points 35 between the ends of levers 36 which are pivoted at 37 to lugs 38 upon the table and have their free ends connected by a rod 39, so that when this rod is drawn forward and upward the two rods 32 are raised equally in their slots 31. Each rod 32 bears near its ends, respectively, blocks 41 in which are suitably mounted transverse rods 42, 43 the latter having its middle portion removed to make room for other parts; but the end portions are yet rigidly connected, as will appear. Blocks 45 are fixed upon the rod 42 near its ends, and in these blocks are secured longitudinally adjustable hooked flask-engaging clamp arms 46 which, when properly adjusted for the particular size of flask which is being used, may have their hooked ends swung over the side of the flask while the rods 32 are in the upper parts of their slots, a handle 48 being conveniently used in swinging the hooks. When they are in proper position, swinging the rod 39 and the levers 36 rearwardly downward draws the rods 32 downward in their slots and pulls the hooks firmly against the flask, clamping this side of it; and in this movement the pivots 34 pass slightly beyond the line joining the centers of the pivot 35 and the pivot of the block 33, thus locking the parts against accidental displacement while leaving them practically free to move into flask-releasing position by the operator. When the hooks are not in use they are held away from the flask by eccentric weights 44, and at such times they are held in raised position by a pivoted catch 50 upon one of the webs of the table, the catch being urged into engagement with one of the forwardly swung levers 36 by a spring 51 which presses it toward a stop 52. The form of this catch is such that it is pushed aside by the lever which it then automatically engages and holds until manually released.

The clamping mechanism on the other side of the flask is similar yet different. The weights 44 are here fixed to the end portions of the rod 43 and carry hook arms 55, 56, terminally in-turned to form hooks which are integrally connected by rod 47 which in effect holds the end portions of the rod 43 in alignment without interfering with the action of the hooks.

Obviously, the swinging of the rod 39 drawing down the rods 32 operates the four clamping hooks.

In operation, the table is first arranged, face up, in its lowest position, a pattern plate and flask are added, and sand is supplied to the flask. When jarring is desired, the pin 24 being retracted from the piston and held out of engagement by the spring, oscillation of the piston is produced in the usual manner. When the flask has been filled, the pin is manually advanced, locking the piston, a flask cover is added, the pairs of clamps, 46 on one side and 58 on the other, are swung over the flask and all four are drawn down firmly upon the cover by swinging the bar 39 and its pivoted arms 36, the latter being automatically locked when at either end of their paths, as above explained. Air is now admitted to the cylinder 17 causing its piston to pull the crank arm 20 and thereby rock the shaft 21 and compel the crank arms 22, acting through the pitmen 23, to raise the slides 12 and corresponding ends of the table to exactly the same degree, if the lengths of the pitmen are properly adjusted. The inversion of the table and withdrawal of the patterns may be effected in the usual way.

What I claim is:

1. In a sand jarring molding machine, the combination with a pneumatic cylinder, of a jarring piston, in said cylinder, arranged to support a flask to be jarred, a locking member movable in a way in the cylinder, manually operable means for carrying said member into piston locking and unlocking positions, and means for yieldingly resisting the movement of the member from either position.

2. In a sand jarring molding machine, the combination with a frame having an anvil member, of a pneumatic cylinder adapted to rest loosely upon said member, a flask-supporting jarring piston working in the cylinder, a manually operable device for locking the piston in its cylinder, and spring devices arranged to hold said manually operable device against accidental movement from its active and inactive positions.

3. The combination with a frame having vertical guiding means, of two reciprocating members, guided by said means, an inverting head supported by said members to rock about a horizontal axis, a rock-shaft below and parallel to said axis, provided with crank arms below the ends, respectively, of the head, and with a third crank arm, a fluid cylinder mounted in the frame and having a piston arranged to oscillate the third crank arm and the crank shaft, and pitmen of adjustable length connecting the crank arms first mentioned with the ends, respectively, of said head.

4. The combination with a flask-supporting inverting head of a molding machine, of transverse shafts mounted in the head to move bodily in parallel vertical planes, flask engaging members carried by said shafts, respectively, and means for manually raising and lowering said shafts with respect to the head.

5. The combination with a flask-supporting inverting head of a molding machine, of transverse shafts mounted in the head near the vertical planes between which a flask is to lie and arranged to pass upwardly and downwardly by bodily lateral movement in the head, of flask-engaging members, of adjustable length, carried by the shafts and rocking thereon into and out of flask-engaging position.

6. The combination with a flask-supporting inverting head, of transverse parallel shafts mounted in slots in the head to move vertically, flask-engaging devices carried by the shafts, means for moving the shafts laterally in their slots, and means for locking the shafts in depressed position.

7. In a molding machine, the combination with an inverting flask-supporting head, of transverse normally horizontal shafts mounted in the head to move bodily in vertical planes, flask engaging members carried by the shafts, manually operable devices for raising and lowering the shafts, and means for at will locking said devices out of operative position.

8. The combination with a flask-supporting head, of transverse shafts arranged to move bodily up and down in the head, flask-engaging members mounted to rock about the axes of the shafts, respectively, into and out of flask-engaging position, and automatic means normally holding said members out of operative position.

In testimony whereof I hereunto affix my signature.

HENRY TSCHERNING.